(12) United States Patent
Harichandan et al.

(10) Patent No.: US 11,433,914 B2
(45) Date of Patent: Sep. 6, 2022

(54) SYSTEM AND METHOD FOR CONTROLLING VEHICLE COMPONENTS USING SMARTPHONE

(71) Applicants: Jyotiranjan Harichandan, Bangalore (IN); Mohit Yadav, Bangalore (IN)

(72) Inventors: Jyotiranjan Harichandan, Bangalore (IN); Mohit Yadav, Bangalore (IN)

(73) Assignees: Jyotiranjan Harichandan, Bangalore (IN); Mohit Yadav, Bangalore (IN)

( * ) Notice: Subject to any disclaimer, the term of this patent is extended or adjusted under 35 U.S.C. 154(b) by 256 days.

(21) Appl. No.: 16/612,737

(22) PCT Filed: May 11, 2018

(86) PCT No.: PCT/IN2018/050294
§ 371 (c)(1),
(2) Date: Nov. 11, 2019

(87) PCT Pub. No.: WO2018/207213
PCT Pub. Date: Nov. 15, 2018

(65) Prior Publication Data
US 2020/0079397 A1 Mar. 12, 2020

(30) Foreign Application Priority Data
May 11, 2017 (IN) .............................. 201741016606

(51) Int. Cl.
*B60W 50/08* (2020.01)
*H04W 4/029* (2018.01)
(Continued)

(52) U.S. Cl.
CPC .......... *B60W 50/085* (2013.01); *B60W 40/09* (2013.01); *G05D 1/0016* (2013.01);
(Continued)

(58) Field of Classification Search
CPC .... B60W 50/085; B60W 40/09; H04W 4/029; H04W 4/40; G05D 1/0016; G07C 5/008; G07C 5/0841
See application file for complete search history.

(56) References Cited

U.S. PATENT DOCUMENTS

| 2011/0238289 A1* | 9/2011 | Lehmann | G01C 21/3617 |
| | | | 701/533 |
| 2018/0024559 A1* | 1/2018 | Seo | G05D 1/021 |
| | | | 701/23 |

(Continued)

*Primary Examiner* — Aniss Chad
*Assistant Examiner* — Stephanie T Su
(74) *Attorney, Agent, or Firm* — Barry Choobin; Patent 360LLC

(57) ABSTRACT

The embodiments herein provide a system and method for controlling an operation of the components in the two/three wheeled vehicle through a smartphone. The system comprises a vehicle module, a smartphone and a cloud computing system. The vehicle module reads the vehicle parameters with a vehicle parameter reader and sensors. The read vehicle parameter are forwarded to the microprocessor for transmission to the smartphone through a transceiver using a wired or wireless network. The microprocessor sends the vehicle parameters data to the smartphone for generating the commands/events for controlling an operation of the parts/components of the vehicle through the vehicle parameter controller. The data is uploaded to a cloud computing system and analyzed using an artificial intelligence module, a machine learning module and a pattern recognition module for providing insights/predictions to the user for controlling the vehicle.

18 Claims, 2 Drawing Sheets

(51) Int. Cl.
*H04W 4/40* (2018.01)
*B60W 40/09* (2012.01)
*G05D 1/00* (2006.01)
*G07C 5/00* (2006.01)
*G07C 5/08* (2006.01)

(52) U.S. Cl.
CPC ........... *G07C 5/008* (2013.01); *G07C 5/0841* (2013.01); *H04W 4/029* (2018.02); *H04W 4/40* (2018.02)

(56) References Cited

U.S. PATENT DOCUMENTS

2018/0053413 A1* 2/2018 Patil ..................... G08G 1/0968
2019/0213429 A1* 7/2019 Sicconi ................. G06F 3/0346

* cited by examiner

SYSTEM AND METHOD FOR CONTROLLING VEHICLE COMPONENTS USING SMARTPHONE

CROSS-REFERENCE TO RELATED APPLICATIONS

This application is a national phase application of the Patent Cooperation Treaty (PCT) international application with serial number PCT/IN2018/050294 filed in the Indian Patent Office on May 11, 2018 with the title "A SYSTEM AND METHOD FOR CONTROLLING VEHICLE COMPONENTS USING SMARTPHONE", and claims the priority and the benefit of the Provisional Patent Application with serial number 201741016606, filed in the Indian Patent Office on May 11, 2017, with the title "SYSTEM AND METHOD FOR CONTROLLING VEHICLE COMPONENTS USING SMARTPHONE". The contents of both the Provisional Patent Application and the PCT international application are incorporated in their entirety by reference herein.

BACKGROUND

Technical Field

The embodiments herein are generally related to a field of automobiles. The embodiments herein are particularly related to a system and method for remotely controlling the operations of two/three wheeled vehicles. The embodiments herein are more particularly related to a system and method for controlling the operation of a plurality of components in two/three wheeled vehicles through mobile computing devices of the user.

Description of the Related Art

Automobile industry has grown many folds in recent times owing to daily travelling commuting involved in a day to day life of a majority of, population to day. Travel to and from a work place accounts for a significant portion of a day in everyone's life by using private or commercial or public transport systems. Thus, automobile manufacturers are always thrive to make vehicles which are safe, comfortable and enjoyable for the users.

The vehicles available in market in recent times include various personalized features for the convenience and safety of the users. These personalized/customized features are adjustable seats, adjustable mirrors, remote keyless entry systems, automatic climate control system and the like. However, all these features are formed as a part of the vehicle and are not truly personalized to a specific user. Further, these features are mostly provided in four wheeled vehicles and not in two/three wheeled vehicles which is a preferred mode of transport for the majority of people around the world.

However, with the advent of advancements in internet and cloud technologies, an enhanced user experience is desired through an addition of new features such as remotely controlling the operations of the vehicle through smartphone of the user to the two/three wheeled vehicles.

Hence, there is a need for a system and method for enhancing user experience while travelling in/riding two/three wheeled vehicles. There is also a need for a system and method for remotely controlling the operations of two/three wheeled vehicles. Further, there is a need for a system and method for controlling the operation of two/three wheeled vehicle components through smartphones or mobile devices of the user.

The above mentioned shortcomings, disadvantages and problems are addressed herein and which will be understood by reading and studying the following specification.

OBJECTIVES OF THE EMBODIMENTS HEREIN

The primary object of the embodiments herein is to provide a system and method for providing enhanced user experience while travelling/riding/using two/three wheeled vehicles.

Another object of the embodiments herein is to provide a system and method for remotely controlling the operations of two/three wheeled vehicles.

Yet another object of the embodiments herein is to provide a system and method for controlling the operation of two/three wheeled vehicle components through smartphones or mobile devices of the user.

Yet another object of the embodiments herein is to provide a system and method for pairing the smartphone of the user with the two/three wheeled vehicle using a wired or wireless connection.

Yet another object of the embodiments herein is to provide a system and method for integrating a microprocessor with the two/three wheeled vehicle for reading various vehicle parameters such as speed, engine revolutions per minute (RPM), fuel level, gear etc. and for controlling various parts/components of the vehicle.

Yet another object of the embodiments herein is to provide a system and method for tracking the components such as controller, motor, BMS, lights indicators, horns and other electronic parts for two and three wheeled vehicles.

Yet another object of the embodiments herein is to provide a system and method for analysing the signals received from two/three wheeled vehicle for issuing commands/events to the microprocessor integrated with the vehicle to control the various components of the vehicle.

Yet another object of the embodiments herein is to provide a system and method for uploading the data related to the vehicle parameters and commands/events on a cloud to build driver profile and allow live tracking of the vehicle parameters through a smartphone.

Yet another object of the embodiments herein is to provide a system and method for controlling one or more turn indicators of the two/three wheeled vehicle through the smartphone of the user.

Yet another object of the embodiments herein is to provide a system and method for remotely controlling a headlight, brake light and pilot lamp of the two/three wheeled vehicle through the smartphone of the user.

Yet another object of the embodiments herein is to provide a system and method for locking/unlocking, immobilizing and operating the handle lock of the two/three wheeled vehicle through the smartphone of the user.

Yet another object of the embodiments herein is to provide a system and method for learning and rating user driving pattern for suggesting riding/travel shortcuts on a map specific to the two/three wheeled vehicle through the smartphone of the user.

Yet another object of the embodiments herein is to provide a system and method for enhancing the overall safety features provided to the user of the two/three wheeled vehicle.

Yet another object of the embodiments herein is to provide, a system and method for mapping road conditions (bumps, humps, slippery roads etc.) based on inputs received from two/three wheeled vehicles of the users, the cloud computing system and one or more sensors provided in the smartphone.

Yet another object of the embodiments herein is to provide a system and method for controlling the speed of two/three wheeled vehicles depending on a speed limit specified on a particular road using the one or more vehicle parameter sensors, microprocessor, vehicle parameter controller, smartphone, and the cloud computing system.

Yet another object of the embodiments herein is to provide a system and method for triggering emergency calls, Short Message Service (SMS) or notifications using the cloud computing system based on the inputs received from the smartphone and the two/three wheeled vehicle.

Yet another object of the embodiments herein is to provide a system and method for sensing the status and locking the handle of the two/three wheeled vehicle autonomously or based on the inputs provided by the user.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The embodiments herein provide a system for controlling the operation of vehicle components in two/three wheeled vehicles through a smartphone of the user. The system comprises a vehicle module integrated with a two/three wheeled vehicle of a user. The vehicle module is configured for reading and transmitting a plurality of vehicle parameters. The plurality of vehicle parameters comprises a speed, an engine RPM, a tyre pressure, break level, fuel level and gear level. This system also tracks a controller, a motor, a battery management system (BMS), a broadcast message system, light indicators (indicator lamps), horns and other electronic parts in two and three wheeled vehicles. The system also comprises a smartphone of a user communicatively coupled with the vehicle module. The smartphone of the user is configured for receiving the plurality of vehicle parameters transmitted from the vehicle module. The smartphone of the user comprises one or more sensors. The one or more sensors are configured for estimating/evaluating a current status of the vehicle based on the status of the plurality of vehicle parameters. The user is enabled/prompted/reminded to send one or more commands/events using the smartphone for controlling the operation of one or more parts/components of the two/three wheeled vehicle based on the data related to the plurality of vehicle parameters. The system further comprises a cloud computing system communicatively coupled with the smartphone of the user. The cloud computing system is configured for storing a data related to the plurality of vehicle parameters and the events/commands sent by the smartphone. The cloud computing system is further configured for building a driver profile and for live tracking of the plurality of vehicle parameters related to the vehicle.

According to an embodiment herein, the vehicle module further comprises a vehicle parameter reader, and wherein the vehicle parameter reader is configured for reading the plurality of vehicle parameters.

According to an embodiment herein, the vehicle module further comprises a microprocessor. The microprocessor is configured for communicating with the smartphone of the user through a transceiver using a wired or wireless connection. The microprocessor is further configured for generating one or more instructions to control the operation of one or more parts/components of the vehicle as per the one or more commands/events received from the smartphone.

According to an embodiment herein, the vehicle module further comprises a vehicle parameter controller. The vehicle parameter controller is configured for controlling the operation of one or more parts/components of the vehicle based on the one or more instructions generated by the microprocessor.

According to an embodiment herein, the cloud computing system further comprises a machine learning module. The machine learning module is configured for analyzing the data collected using the vehicle module and the smartphone.

According to an embodiment herein, the cloud computing system further comprises a pattern recognition module. The pattern recognition module is configured for identifying a plurality of patterns (present) in the data collected using the vehicle module and the smartphone.

According to an embodiment herein, the cloud computing system further comprises an artificial intelligence module. The artificial intelligence module is configured for providing a plurality of insights/predictions/details regarding the functioning of the vehicle based on the analysis performed b the machine learning module and pattern recognition module.

According to an embodiment herein, the vehicle parameter reader is configured for reading the plurality of vehicle parameters using the one or more vehicle parameter sensors. The one or more vehicle parameter sensors comprise an engine control unit (ECU), an instrument cluster, a tire-pressure sensor, a body control module, a rain sensor, a gyroscope, an accelerometer, a side/main stand sensor, a brake sensor and a handle position sensor.

According to an embodiment herein, the one or more sensors provided in the smartphone comprise GPS, accelerometer, fingerprint scanner, iris scanner, microphone, speaker, compass, camera and gyroscope.

According to an embodiment herein, the machine learning module is further configured for identifying new routes based on a location related data gathered/collected/acquired from the smartphone.

According to an embodiment herein, the one or more operations controlled with the system comprise controlling one or more turn/direction indicators or indicator lamps of the vehicle by providing aa unique way of navigational guidance, controlling the headlight, brake light and pilot lamp of the vehicle based on ambient light conditions and lock/unlock, immobilizing and operating the handle lock of the vehicle by adding biometric authentication using the smartphone.

According to an embodiment herein, the system is further configured for learning and rating user driving patterns and for suggesting riding/travel shortcuts (shortcut routes for ridings/travels) a map specific to each two/three wheeled vehicle.

According to an embodiment herein, the system is further configured for providing a software application downloadable on the smartphone of the user. The user is enabled/prompted with the microprocessor to send one or more commands/events for operating the various pans/components of the vehicle using the software application.

According to an embodiment herein, a method is provided for controlling the operation of vehicle components in two/three wheeled vehicles through smartphone of the user. The method comprises the steps of pairing the smartphone of the user with a vehicle module integrated with the vehicle and reading a plurality of vehicle parameters using vehicle parameter reader via one or more vehicle parameter sensors provided in the vehicle module. The method also comprises transferring a data related to the one or more vehicle parameters to a microprocessor that transmits the data to a paired smartphone using a transceiver. The method further comprises processing the data received from the microprocessor using the smartphone for generating and transmitting/forwarding an one or more commands/even is to the microprocessor to control various parts/components of two/three wheeled vehicle. The method still further comprises sending commands to the microprocessor and directing the vehicle parameter controller to control a plurality of parts/components in the two/three wheeled vehicle.

According to an embodiment herein, the method further comprises uploading the data related to the plurality of vehicle parameters and related to the events/commands to a cloud computing system.

According to an embodiment herein, the method further comprises analyzing the uploaded data with an artificial intelligence module, machine learning algorithms and pattern recognition module for further processing.

According to an embodiment herein, the method further comprises communicating with the smartphone of the user through a transceiver provided in the vehicle module through a wired or wireless connection.

According to an embodiment herein, the method further comprises for identifying new routes based on the location related data gathered/collected from the smartphone.

According to an embodiment herein, the method farther comprises performing one or more vehicle operations remotely through the smartphone of the user. The one or more operations comprise controlling one or more turn indicators (direction indicators, side indicators, indicator lamps) of the vehicle by providing a unique way of navigational guidance, controlling the headlight, brake light and pilot lamp of the vehicle based on an ambient light conditions, locking/unlocking operations, immobilizing operation, and operating the handle lock of the vehicle by adding biometric authentication using the smartphone.

According to an embodiment herein, the method further comprises learning and rating a user driving patterns and for suggesting riding shortcuts on a map specific to each two/three wheeled vehicle.

The embodiments herein provide a system and method for controlling the operation of two/three wheeled vehicle components through smartphones or mobile devices of the user.

The system comprises a vehicle module, a smartphone and a cloud computing system. The vehicle module comprises one or more vehicle parameter sensors, a vehicle parameter reader, a vehicle parameter controller, a microprocessor and a transceiver. The vehicle module is integrated with the two/three wheeled vehicle. The vehicle parameter reader is configured for reading plurality of vehicle parameters such as speed, engine RPM, fuel level gear etc, using one or more vehicle parameter sensors. This system also tracks controller, motor, BMS, lights indicators, horns and other electronic parts for two and three wheeled vehicles. The vehicle parameter reader is further configured for sending the read parameters to the microprocessor.

According to an embodiment herein, the microprocessor is configured for receiving a plurality of vehicle parameters from the vehicle parameter reader and for communicating with the smartphone through the transceiver using a wired or wireless connection. The microprocessor is configured to send/forward the data related to plurality of vehicle parameters to the smartphone.

According to an embodiment herein, the smartphone is configured to process the data received from the microprocessor. The smartphone comprises one or more sensors for accessing the current status of the vehicle based on the status of the plurality of vehicle parameters. The smartphone is further configured to generate and forward commands/events to the microprocessor to control the plurality of parts/components in the two/three wheeled vehicle.

According to an embodiment herein, the microprocessor is further configured for receiving the commands from the microprocessor for sending a signal to the vehicle parameter controller to control the operation of one or more parts/components of the vehicle such as headlight, indicators, engine immobilizer, throttle controller, engine control unit, handle lock, handle motor control, etc. The commands/events are generated based on the data related to plurality of vehicle parameters acquired from the microprocessor.

According to an embodiment herein, the data related to the plurality of vehicle parameters and to the events/commands is also uploaded to a cloud for further processing by the smartphone. The data uploaded via the smartphone is utilized to build a driver profile and to allow a live tracking of the plurality of vehicle parameters related to the two/three wheeled vehicle. The location related data received from the smartphone is analyzed using one or more machine learning algorithms to search and identify patterns such as new routes etc.

According to an embodiment herein, the cloud computing system forms the backend of the system and is configured for storing the data collected via microprocessor and smartphone. The cloud computing system also performs several analytical operations on the stored data using artificial intelligence module and machine learning module. Patterns are identified in the data using a pattern recognition module to provide insights and to control the various parts/components of the two/three wheeled vehicle via smartphone. This also helps in mapping various road conditions and surrounding details such as speed breakers, pot holes, slippery roads, bumpy roads and the like.

According to an embodiment herein, the system is configured for performing a variety of operations such as controlling one or more turn indicators of the two/three wheeled vehicle by providing unique way of navigational guidance, controlling the headlight, brake light and pilot lamp of the two/three wheeled vehicle based on ambient light conditions, performing lock/unlock operations, and immobilizing and operating the handle lock of the two/three wheeled vehicle by adding biometric authentication using the smartphone and the like. The system is further configured for learning and rating user driving pattern and also suggesting riding shortcuts on map specific to two/three wheeled vehicle. The system also provides details about the road conditions and triggers emergency responses (such as emergency calls, SMS or notifications) on detecting any crash, fall etc. The system performs all these operations by using the functionalities of the microprocessor, smartphone, cloud computing system, one or more vehicle parameter sensors and the one or more sensors provided in the smartphone.

According to an embodiment herein, the system is configured for providing a software application hosted on the smartphone of the user. The user registers with the system through the software application by providing various personal details. The smartphone of the user is paired with the vehicle module using a wired or wireless connection on successful authentication via the software application present on the smartphone. The user authentication is performed using fingerprint scan, iris scan or voice recognition. The smartphone additionally is equipped with artificial intelligence algorithms, machine learning algorithms and pattern recognition algorithms as part of the installed software application. These algorithms are used for issuing commands to microprocessor provided in the vehicle module for controlling the parts of vehicle.

According to an embodiment herein, a method for controlling the operation of two/three wheeled vehicle components through smartphones of the user is provided. The method comprises the steps of pairing a smartphone of the user with a vehicle module integrated with the vehicle. A plurality of vehicle parameters are read using vehicle parameter reader via one or more vehicle parameter sensors provided in the vehicle module. The data related to the one or more vehicle parameters is transferred to the microprocessor that in turn transmits the data to the paired smartphone using a transceiver. The smartphone is configured to process the data received from the microprocessor to generate commands/events to be transmitted to the microprocessor to control the plurality of parts/components of the two/three wheeled vehicle. The microprocessor is configured to receive the commands from the smartphone to direct the vehicle parameter controller to control various parts/components of the two/three wheeled vehicle. The data related to the plurality of vehicle parameters and data related to the events/commands is also uploaded to the cloud computing system by the smartphone. The uploaded data is analyzed using artificial intelligence, machine learning algorithms and pattern recognition for further processing. The analysed data is used for providing insights to the user and for controlling the vehicle via smartphone.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can, be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1:
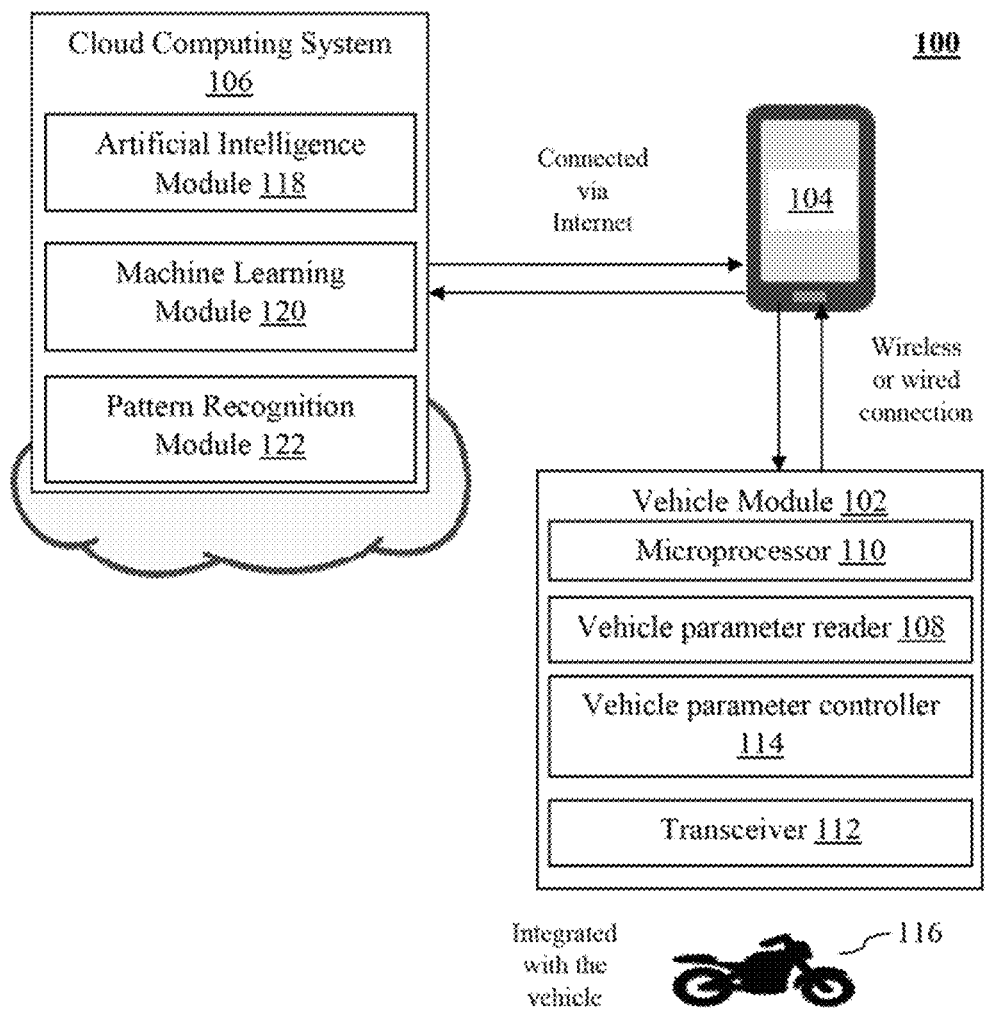
FIG. 1 illustrates a functional block diagram of the system for controlling the operation of two/three wheeled vehicle components through smartphones of the user, according to an embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system for controlling the operation of vehicle components in two/three wheeled vehicles through a smartphone of the user. The system comprises a vehicle module integrated with a two/three wheeled vehicle of a user. The vehicle module is configured for reading and transmitting a plurality of vehicle parameters. The plurality of vehicle parameters comprises a speed, an engine RPM, a tyre pressure, break level, fuel level and gear level. This system also tracks a controller, a motor, a battery management system (BMS), a broadcast message system, light indicators (indicator lamps), horns and other electronic parts in two and three wheeled vehicles. The system also comprises a smartphone of a user communicatively coupled with the vehicle module. The smartphone of the user is configured for receiving the plurality of vehicle parameters transmitted from the vehicle module. The smartphone of the user comprises one or more sensors. The one or more sensors are configured for estimating/evaluating a current status of the vehicle based on the status of the plurality of vehicle parameters. The user is enabled/prompted/reminded to send one or more commands/events using the smartphone for controlling the operation of one or more parts/components of the two/three wheeled vehicle based on the data related to the plurality of vehicle parameters. The system further comprises a cloud computing system communicatively coupled with the smartphone of the user. The cloud computing system is configured for storing a data related to the plurality of vehicle parameters and the events/commands sent by the smartphone. The cloud computing system is further configured for building a driver profile and for live tracking of the plurality of vehicle parameters related to the vehicle.

According to an embodiment herein, the vehicle module further comprises a vehicle parameter reader, and wherein the vehicle parameter reader is configured for reading the plurality of vehicle parameters.

According to an embodiment herein, the vehicle module further comprises a microprocessor. The microprocessor is configured for communicating with the smartphone of the user through a transceiver using a wired or wireless connection. The microprocessor is further configured for generating one or more instructions to control the operation of one or more parts/components of the vehicle as per the one or more commands/events received from the smartphone.

According to an embodiment herein, the vehicle module further comprises a vehicle parameter controller. The vehicle parameter controller is configured for controlling the operation of one or more parts/components of the vehicle based on the one or more instructions generated by the microprocessor.

According to an embodiment herein, the cloud computing system further comprises a machine learning module. The machine learning module is configured for analyzing the data collected using the vehicle module and the smartphone.

According to an embodiment herein, the cloud computing system further comprises a pattern recognition module. The pattern recognition module is configured for identifying a plurality of patterns (present) in the data collected using the vehicle module and the smartphone.

According to an embodiment herein, the cloud computing system further comprises an artificial intelligence module. The artificial intelligence module is configured for providing a plurality of insights/predictions/details regarding the functioning of the vehicle based on the analysis performed b the machine learning module and pattern recognition module.

According to an embodiment herein, the vehicle parameter reader is configured for reading the plurality of vehicle parameters using the one or more vehicle parameter sensors. The one or more vehicle parameter sensors comprise an engine control unit (ECU), an instrument cluster, a tire-pressure sensor, a body control module, a rain sensor, a gyroscope, an accelerometer, a side/main stand sensor, a brake sensor and a handle position sensor.

According to an embodiment herein, the one or more sensors provided in the smartphone comprise GPS, accelerometer, fingerprint scanner, iris scanner, microphone, speaker, compass, camera and gyroscope.

According to an embodiment herein, the machine learning module is further configured for identifying new routes based on a location related data gathered/collected/acquired from the smartphone.

According to an embodiment herein, the one or more operations controlled with the system comprise controlling one or more turn/direction indicators or indicator lamps of the vehicle by providing aa unique way of navigational guidance, controlling the headlight, brake light and pilot lamp of the vehicle based on ambient light conditions and lock/unlock, immobilizing and operating the handle lock of the vehicle by adding biometric authentication using the smartphone.

According to an embodiment herein, the system is further configured for learning and rating user driving patterns and for suggesting riding/travel shortcuts (shortcut routes for ridings/travels) a map specific to each two/three wheeled vehicle.

According to an embodiment herein, the system is further configured for providing a software application downloadable on the smartphone of the user. The user is enabled/prompted with the microprocessor to send one or more commands/events for operating the various parts/components of the vehicle using the software application.

According to an embodiment herein, a method is provided for controlling the operation of vehicle components in two/three wheeled vehicles through smartphone of the user. The method comprises the steps of pairing the smartphone of the user with a vehicle module integrated with the vehicle and reading a plurality of vehicle parameters using vehicle parameter reader via one or more vehicle parameter sensors provided in the vehicle module. The method also comprises transferring a data related to the one or more vehicle parameters to a microprocessor that transmits the data to a paired smartphone using a transceiver. The method further comprises processing the data received from the microprocessor using the smartphone for generating and transmitting/forwarding an one or more commands/even is to the microprocessor to control various parts/components of two/three wheeled vehicle. The method still further comprises sending commands to the microprocessor and directing the vehicle parameter controller to control a plurality of parts/components in the two/three wheeled vehicle.

According to an embodiment herein, the method further comprises uploading the data related to the plurality of vehicle parameters and related to the events/commands to a cloud computing system.

According to an embodiment herein, the method further comprises analyzing the uploaded data with an artificial intelligence module, machine learning algorithms and pattern recognition module for further processing.

According to an embodiment herein, the method further comprises communicating with the smartphone of the user through a transceiver provided in the vehicle module through a wired or wireless connection.

According to an embodiment herein, the method further comprises for identifying new routes based on the location related data gathered/collected from the smartphone.

According to an embodiment herein, the method further comprises performing one or more vehicle operations remotely through the smartphone of the user. The one or more operations comprise controlling one or more turn indicators (direction indicators, side indicators, indicator lamps) of the vehicle by providing a unique way of navigational guidance, controlling the headlight, brake light and pilot lamp of the vehicle based on an ambient light conditions, locking/unlocking operations, immobilizing operation, and operating the handle lock of the vehicle by adding biometric authentication using the smartphone.

According to an embodiment herein, the method further comprises learning and rating a user driving patterns and for suggesting riding shortcuts on a map specific to each two/three wheeled vehicle.

The embodiments herein provide a system and method for controlling the operation of two/three wheeled vehicle components through smartphones or mobile devices of the user. The system comprises a vehicle module, a smartphone and a cloud computing system. The vehicle module comprises one or more vehicle parameter sensors, a vehicle parameter reader, a vehicle parameter controller, a microprocessor and a transceiver. The vehicle module is integrated with the two/three wheeled vehicle. The vehicle parameter reader is configured for reading plurality of vehicle parameters such as speed, engine RPM, fuel level gear etc, using one or more vehicle parameter sensors. This system also tracks controller, motor, BMS, lights indicators, horns and other electronic parts for two and three wheeled vehicles. The vehicle parameter reader is further configured for sending the read parameters to the microprocessor.

According to an embodiment herein, the microprocessor is configured for receiving a plurality of vehicle parameters from the vehicle parameter reader and for communicating with the smartphone through the transceiver using a wired or wireless connection. The microprocessor is configured to send/forward the data related to plurality of vehicle parameters to the smartphone.

According to an embodiment herein, the smartphone is configured to process the data received from the microprocessor. The smartphone comprises one or more sensors for accessing the current status of the vehicle based on the status of the plurality of vehicle parameters. The smartphone is further configured to generate and forward commands/ events to the microprocessor to control the plurality of parts/components in the two/three wheeled vehicle.

According to an embodiment herein, the microprocessor is further configured for receiving the commands from the microprocessor for sending a signal to the vehicle parameter controller to control the operation of one or more parts/ components of the vehicle such as headlight, indicators, engine immobilizer, throttle controller, engine control unit, handle lock, handle motor control, etc. The commands/ events are generated based on the data related to plurality of vehicle parameters acquired from the microprocessor.

According to an embodiment herein, the data related to the plurality of vehicle parameters and to the events/commands is also uploaded to a cloud for further processing by the smartphone. The data uploaded via the smartphone is utilized to build a driver profile and to allow a live tracking of the plurality of vehicle parameters related to the two/three wheeled vehicle. The location related data received from the smartphone is analyzed using one or more machine learning algorithms to search and identify patterns such as new routes etc.

According to an embodiment herein, the cloud computing system forms the backend of the system and is configured for storing the data collected via microprocessor and smartphone. The cloud computing system also performs several analytical operations on the stored data using artificial intelligence module and machine learning module. Patterns are identified in the data using a pattern recognition module to provide insights and to control the various parts/components of the two/three wheeled vehicle via smartphone. This also helps in mapping various road conditions and surrounding details such as speed breakers, pot holes, slippery roads, bumpy roads and the like.

According to an embodiment herein, the system is configured for performing a variety of operations such as controlling one or more turn indicators of the two/three wheeled vehicle by providing unique way of navigational guidance, controlling the headlight, brake light and pilot lamp of the two/three wheeled vehicle based on ambient light conditions, performing lock/unlock operations, and immobilizing and operating the handle lock of the two/three wheeled vehicle by adding biometric authentication using the smartphone and the like. The system is further configured for learning and rating user driving pattern and also suggesting riding shortcuts on map specific to two/three wheeled vehicle. The system also provides details about the road conditions and triggers emergency responses (such as emergency calls, SMS or notifications) on detecting any crash, fall etc. The system performs all these operations by using the functionalities of the microprocessor, smartphone, cloud computing system, one or more vehicle parameter sensors and the one or more sensors provided in the smartphone.

According to an embodiment herein, the system is configured for providing a software application hosted on the smartphone of the user. The user registers with the system through the software application by providing various personal details. The smartphone of the user is paired with the vehicle module using a wired or wireless connection on successful authentication via the software application present on the smartphone. The user authentication is performed using fingerprint scan, iris scan or voice recognition. The smartphone additionally is equipped with artificial intelligence algorithms, machine learning algorithms and pattern recognition algorithms as part of the installed software application. These algorithms are used for issuing commands to microprocessor provided in the vehicle module for controlling the parts of vehicle.

According to an embodiment herein, a method for controlling the operation of two/three wheeled vehicle components through smartphones of the user is provided. The method comprises the steps of pairing a smartphone of the user with a vehicle module integrated with the vehicle. A plurality of vehicle parameters are read using vehicle parameter reader via one or more vehicle parameter sensors provided in the vehicle module. The data related to the one or more vehicle parameters is transferred to the microprocessor that in turn transmits the data to the paired smartphone using a transceiver. The smartphone is configured to process the data received from the microprocessor to generate commands/events to be transmitted to the microprocessor to control the plurality of parts/components of the two/three wheeled vehicle. The microprocessor is configured to receive the commands from the smartphone to direct the vehicle parameter controller to control various parts/ components of the two/three wheeled vehicle. The data related to the plurality of vehicle parameters and data related to the events/commands is also uploaded to the cloud computing system by the smartphone. The uploaded data is analyzed using artificial intelligence, machine learning algorithms and pattern recognition for further processing. The analysed data is used for providing insights to the user and for controlling the vehicle via smartphone.

FIG. 1 illustrates a functional block diagram of the system for controlling the operation of two/three wheeled vehicle components through smartphone of the user, according to an embodiment herein. The system comprises a vehicle module 102, a smartphone 104 and a cloud computing system 106. The vehicle module 102 comprises a vehicle parameter reader 108, a microprocessor 110 transceiver 112 and a vehicle parameter controller 114. The vehicle module 102 is integrated with the two/three wheeled vehicle 116. The vehicle parameter reader 108 is configured for reading plurality of vehicle parameters such as speed, engine RPM, fuel level, gear etc. using one or more vehicle parameter sensors (not shown). This system also tracks controller, motor, BMS, lights indicators, horns & other electronic parts for two and three wheeled vehicles. The one or more vehicle parameter sensors include, ECU, instrument cluster, tire pressure sensor, body control module, rain sensor, gyroscope, accelerometer, side/main stand sensor, brake sensor, handle position sensor and the like. The vehicle parameter reader 108 transfers the data related to the plurality of vehicle parameters to the microprocessor 110.

The microprocessor 110 is further configured for communicating with the smartphone 104 through the transceiver 112 using a wired or wireless connection. The microprocessor 110 sends data related to plurality of vehicle parameters to the smartphone 104.

According to an embodiment herein, the smartphone 104 processes the data received from the microprocessor 110. The smartphone 104 comprises one or more sensors (not shown) for accessing the current status of the vehicle based on the status of the plurality of vehicle parameters. The one or more sensors include GPS, accelerometer, fingerprint scanner, iris scanner, microphone, speaker, compass, camera, gyroscope and the like. The smartphone 104 further generates commands/events for sending to the microprocessor 110 to control the various parts/components of the two/three wheeled vehicle.

According to an embodiment herein, the microprocessor 110 is further configured to receive one or more commands/events from the smartphone 104 for controlling the operation of various parts/components of the two/three wheeled vehicle 116. The commands/events are based on the data related to plurality of vehicle parameters made available by the microprocessor 110. The microprocessor 110 sends the commands/events to the vehicle parameter controller 114 to control the operation of various parts/components of the two/three wheeled vehicle 116. The vehicle parameter controller 114 is further configured for controlling the operation of one or more parts/components of the vehicle 116 such as headlight, indicators, engine immobilizer, handle lock, handle motor control, and the like.

According to an embodiment herein, the data related to the plurality of vehicle parameters and data related to the events/commands is uploaded to the cloud computing system 106 for further processing by the smartphone 104. The data uploaded via the smartphone 104 is utilized to build driver profile and allow live tracking of the plurality of vehicle parameters related to the two/three wheeled vehicle 116. The location related data received from the smartphone 104 is analyzed using one or more machine learning algorithms to search and identify patterns such as new routes etc.

According to an embodiment herein, the cloud computing system 106 forms the backend of the system 100 and is configured for storing the data collected via microprocessor 110 and smartphone 104. The cloud computing system 106 also performs several analytical operations on the stored data using artificial intelligence module 118, machine learning module 120 and pattern recognition module 122. Patterns are identified in the data to provide insights and to control the various parts/components of the two/three wheeled vehicle 116 via smartphone 104.

According to an embodiment herein, the system 100 is configured for performing a variety of operations such as controlling one or more turn indicators of the two/three wheeled vehicle by providing unique way of navigational guidance, control the headlight, brake light and pilot lamp of the two/three wheeled vehicle based on ambient light conditions and lock/unlock, immobilize and to operate the handle lock of the two/three wheeled vehicle 116 by adding biometric authentication using the smartphone 104 and the like. The system 100 is further configured for learning and rating user driving pattern and also suggesting riding shortcuts on a map specific to two/three wheeled vehicle 116. The system 100 performs all these operations by using the functionalities of the microprocessor 110, smartphone 104, cloud computing system 106, one or more vehicle parameter reader 108, vehicle parameter controller 114 and the one or more sensors (not shown) provided in the smartphone 104.

According to an embodiment herein, the system 100 is configured for providing a software application hosted on the smartphone of the user. The user registers with the system 100 through the software application by providing various personal details. The smartphone 104 of the user is paired with vehicle module 102 using a wired or wireless connection on successful authentication via the software application present on the smartphone 104. The user authentication is performed using fingerprint scan, iris scan or voice recognition.

According to an embodiment herein, enhanced security of the two/three wheeled vehicle 116 is achieved by adding biometric authentication using the smartphone 104 to lock/unlock, immobilize and to operate the handle lock of the two/three wheeled vehicle 116. This is achieved by using a fingerprint scanner, iris scanner, and/or microphone present on the smartphone. Firstly, the user pairs his/her smartphone with the two/three wheeled vehicle 116 via the vehicle module 102 using a wired or wireless connection. User authentication is performed via the software application present on the smartphone using fingerprint, iris or voice. Once the identity of the user is confirmed on the smartphone, a signal is sent to the vehicle parameter controller 114 via the microprocessor 110 provided in the vehicle module 102 for locking/unlocking the two/three wheeled vehicle 116. The vehicle parameter controller 114 actuates an unlocking mechanism to unlock the vehicle.

According to an embodiment herein, indicator assistance is provided to the user to aid road safety and enable a unique way of navigational guidance for the two/three wheeled vehicle 116. This is achieved using a GPS, compass or map software present on the smartphone by detecting the vehicle parameters such as speed and odometer as read by the microprocessor 110. Firstly, the user pairs his/her smartphone 104 with the two/three wheeled vehicle 116 via the vehicle module 102 using a wired or wireless connection. The user then enters a destination location through the software application. The system calculates a best route using a mapping software. As the vehicle starts moving, the position relative to any turn is identified using GPS, compass and the mapping software. Once the vehicle position is identified, the system waits till GPS accuracy is within 20 meters range. At this point, the vehicle parameters read by the microprocessor 110 are used for calculating vehicle speed and for recording the odometer reading. Further, the change in GPS, odometer and speed reading is used for precisely calculating distance from the turn. Since this is real time and accurate data, this method provides unprecedented accuracy in predicting the distance from the turns.

Once the user is close enough to the turn, a signal is sent from the smartphone 104 to the vehicle parameter controller 114 via microprocessor 110 provided within the vehicle module 102 to start blinking the turn indicator of the vehicle based on the directions that are stored in the smartphone 104. Further, a combination of odometer, speed, GPS, compass and gyroscope is used to find if the turn is completed and the indicator is turned off automatically. User is also provided with an option to manually override the command issued to the vehicle parameter controller 114 to switch off or change the direction of the turn indicator.

According to an embodiment herein, the capabilities of the microprocessor, smartphone and cloud computing system are used for locking/unlocking, immobilizing and operating the handle lock of the two/three wheeled vehicle 116. Here, the cloud computing system 106 uses artificial intelligence and machine learning algorithms to analyse user driving patterns specific to the two/three wheeled vehicle 116 and suggests better shortcut ways on top of existing mapping software. Firstly, the user pairs his/her smartphone with the two/three wheeled vehicle 116 via the vehicle module 102 using a wired or wireless connection. The user enters a destination location in the software application. The system calculates a best route using available mapping software. The user uses his/her knowledge of local shortcuts and deviates from the route. The system marks these incidents and checks if the user has arrived at the same destination or not at the end of the trip. These incidents are sent to the cloud where artificial intelligence and machine learning algorithms are used to build corpus of routes on top of existing mapping software. Thus, confidence of the route is built based on crowd sourced data. Next time user enters the same destination, the system presents him/her an updated route based on the confidence value that has already been used by other riders and saves time in the process.

According to an embodiment herein, the data available from the one or more vehicle parameter sensors and the one or more sensors (not shown) provided in the smartphone 104 is used for controlling the behaviour and monitor the plurality of vehicle parameters. Firstly, the user pairs his/her smartphone with the two/three wheeled vehicle 116 via the vehicle module 102 using a wired or wireless connection. The present conditions on the road and of the rider are determined using the one or more vehicle parameter sensors and the one or more sensors (not shown) provided in the smartphone 104. This data is then used for performing several operations such as switching on hazard light in tunnel, or fog lamps when fog sets in, switching on the lights when there is rain, change anti-lock braking system settings based on the condition of the road, alerting driver for bumps on road or damaged roads.

According to an embodiment herein, the system is used for enhancing road safety by auto switching off/on of headlight, pilot light and tail light based on ambient light conditions for two/three wheeled vehicle. This is achieved by using an ambient light sensor, GPS, mapping software and compass present on the smartphone. Firstly, the user pairs his/her smartphone with the two/three wheeled vehicle 116 via the vehicle module 102 using a wired or wireless connection. This helps the system in knowing that the user is riding the vehicle. The change in lighting conditions is calculated using the ambient light sensor present in the smartphone 104 and a signal is sent to the vehicle parameter controller 114 via the microprocessor 110 provided within vehicle module 102 to switch on the headlight and taillight. Similarly, GPS, compass, mapping software and ambient light sensor is used to identify if the user is inside a tunnel and automatically switch on the hazard lights to enhance safety.

In case, the user switches on headlight/hazard light manually, then the system records and sends these incidences to the cloud computing system 106 in order to identify areas on map which have low visibility and further improve the routes corpus. In addition, the smartphone 104 uses GPS and internet to find out local weather conditions and automatically switches on hazard lights in case of a heavy rain, storm or snow fall. When multiple riders switch on their hazard lights manually or automatically, this data is crowd sourced via the cloud computing system 106 and further alerts are sent to riders approaching the same area.

According to an embodiment herein, the system provides user the ability to answer a phone call only in case he/she is using a headset or if the vehicle has completely come to rest position. Otherwise, the system auto declines the call with a message. In case, the headset is not connected then the readings of vehicle parameter reader 108 are used to find out if the vehicle has completely come to rest or not. On detecting that the vehicle has come to rest, the user is provided with an option to either answer the call or else auto decline the call with a message.

According to an embodiment herein, user safety is enhanced by auto detecting crashes and by sending SOS messages. This is achieved by using an accelerometer and gyroscope sensor present on the smartphone 104 and by detecting the speed of the vehicle using vehicle module 102. When the smartphone 104 is paired with the vehicle module 102, the system detects any crash using an accelerometer and gyroscope sensor present on the smartphone 104 and by detecting the speed of the vehicle using vehicle module 102. The system sends out SOS message via the smartphone 104 and records this incident on the cloud computing system 106.

Figure 2:
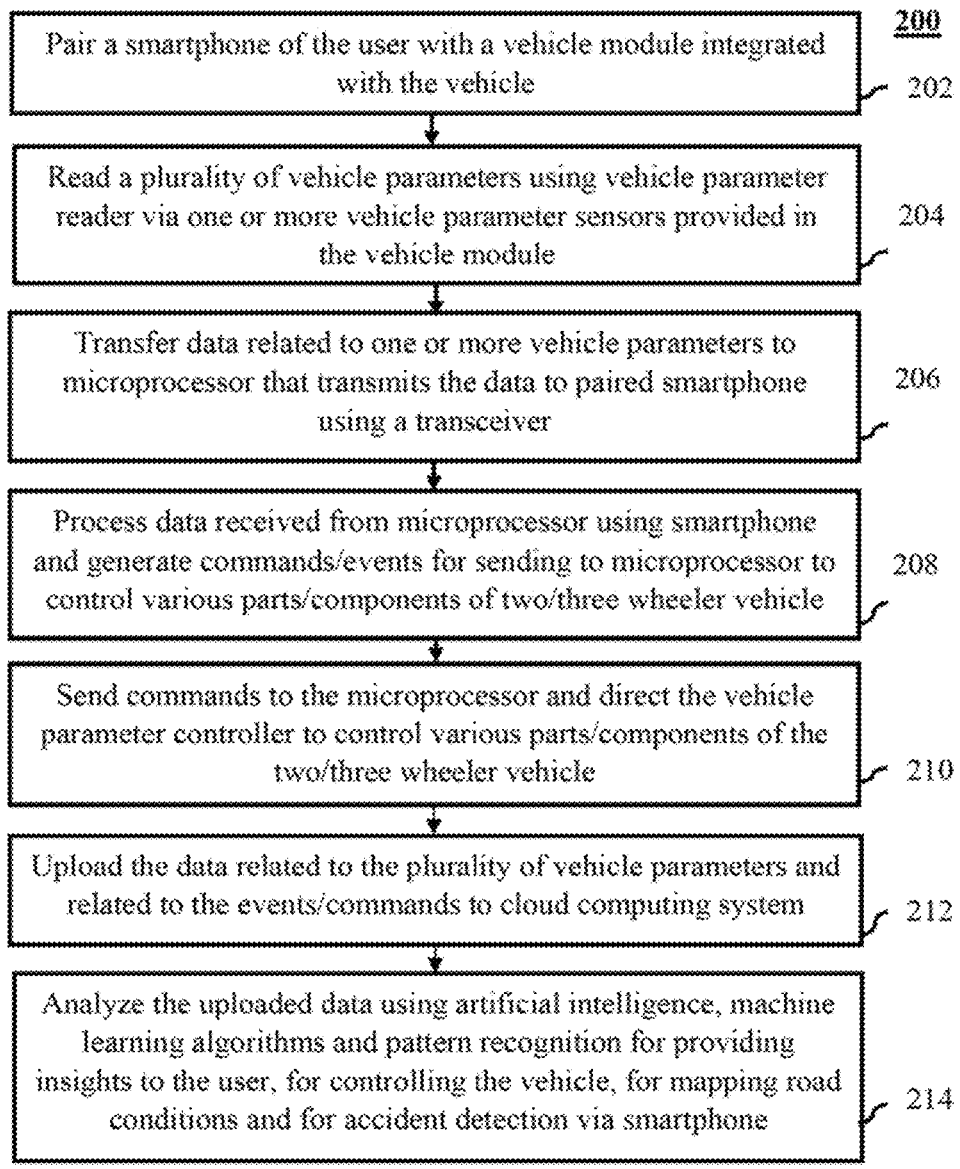
FIG. 2 illustrates a flowchart explaining a method for controlling the operation of two/three wheeled vehicle components through smartphones of the user, according to an embodiment herein.

FIG. 2 illustrates a flowchart explaining a method for controlling the operation of two/three wheeled vehicle components through smartphones of the user, according to an embodiment herein. The method comprises the steps of pairing a smartphone of the user with a vehicle module integrated with the vehicle (202). A plurality of vehicle parameters are read using vehicle parameter reader via one or more vehicle parameter sensors provided in the vehicle module (204). The data related to the one or more vehicle parameters is transferred to the microprocessor that in turn transmits the data to the paired smartphone using a transceiver (206). The smartphone processes the data received from the microprocessor and generates commands/events for sending to the microprocessor to control the various parts/components of the two/three wheeled vehicle (208). The microprocessor receives the commands from the smartphone and directs the vehicle parameter controller to control various parts/components of the two/three wheeled vehicle (210). The data related to the plurality of vehicle parameters and data related to the events/commands is also uploaded to the cloud computing system by the smartphone (212). The uploaded data is analyzed using artificial intelligence, machine learning algorithms and pattern recognition for further processing. The analyzed data is used for providing insights to the user and for controlling the vehicle via smartphone (214).

Therefore, the embodiments herein disclose a system and method for controlling the operation of two/three wheeled vehicle components through smartphone of the user. The system combines sensors provided on the smartphone and the two/three wheeled vehicle to control the behaviour and monitor data of the two/three wheeled vehicle. This approach is extremely cost effective and modular to be incorporated into any two/three wheeled vehicle. The system provides an indicator assistance to the user to aid road safety and enable a unique way of navigational guidance for the two/three wheeled vehicle. The system further enhances road safety by auto switching off/on of headlight, pilot light and tail light based on ambient light conditions for the two/three wheeled vehicle. Further, biometric authentication is provided by using the smartphone to look/unlock, immobilize and to operate lock the handle of the two/three wheeled vehicle. The system uses capabilities of the microprocessor, smartphone and cloud computing system to learn and rate user driving pattern and also suggest riding shortcuts on map specific to the two/three wheeled vehicle.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be the to fall there between.

What is claimed is:

1. A system for controlling an operation of two or three wheeled vehicle components through smartphone of the user using one or more applications or algorithms, the system comprising:
    a vehicle module integrated with a two or three wheeled vehicle of a user, and wherein the vehicle module is configured for reading and transmitting a plurality of vehicle parameters through an application or algorithm, and wherein the plurality of vehicle parameters comprise speed, engine RPM, tyre pressure, brake level, fuel level and gear level, and where the system tracks controller, motor, battery monitoring system (BMS), lights indicators, horns and other electronic parts for two and three wheeled vehicles;
    a smartphone of a user communicatively coupled with the vehicle module, and wherein the smartphone of the user is configured for receiving the plurality of vehicle parameters transmitted from the vehicle module, and wherein the smartphone of the user comprises one or more sensors, and wherein the one or more sensors are configured a current status of the vehicle based on the received plurality of vehicle parameters, and wherein the smartphone is configured to enable or prompt the user to send one or more commands or events for controlling an operation of one or more parts or components of the two or three wheeled vehicle through the smartphone based on the data related to the plurality of vehicle parameters; and
    a cloud computing server communicatively coupled with the smartphone of the user, and wherein the cloud computing server is configured for storing a data related to the plurality of vehicle parameters and the one or more commands or events sent by the smartphone, and wherein the cloud computing server is further configured for building a driver profile and for live tracking of the plurality of vehicle parameters related to the vehicle through an application or algorithm;
    wherein the one or more operations controlled remotely with the smartphone comprise controlling one or more turn indicators or side indicators or indicator lamps of the vehicle by providing navigational guidance, controlling an operation of headlight, brake light and pilot lamp of the vehicle based on ambient light conditions and locking and unlocking operation, immobilizing a handle lock and operating the handle lock of the vehicle by adding biometric authentication using the smartphone.

2. The system according to claim 1, wherein the vehicle module comprises a vehicle parameter reader, and wherein the vehicle parameter reader is configured for reading the plurality of vehicle parameters through an application or algorithm.

3. The system according to claim 1, wherein the vehicle module comprises a microprocessor, and wherein the microprocessor is configured for communicating with the smartphone of the user through a transceiver using a wired or wireless communication or connection, and wherein the microprocessor is further configured for generating one or more instructions to control the operation of one or more parts or components of the vehicle based on the one or more commands or events received from the smartphone.

4. The system according to claim 1, wherein the vehicle module comprises a vehicle parameter controller, and wherein the vehicle parameter controller is configured for controlling the operation of one or more parts or components of the vehicle based on the one or more instructions generated by the microprocessor.

5. The system according to claim 1, wherein the cloud computing server comprises a machine learning module, and wherein the machine learning module is configured for analyzing a data collected using the vehicle module and the smartphone through an application or algorithm.

6. The system according to claim 1, wherein the cloud computing server comprises a pattern recognition module and wherein the pattern recognition module is configured for identifying patterns present in the data collected with the vehicle module and the smartphone through an application or algorithm.

7. The system according to claim 1, wherein the cloud computing server comprises an artificial intelligence module, and wherein the artificial intelligence module is configured for providing a plurality of insights or predictions regarding a functioning of the vehicle based on an analysis performed by the machine learning module and pattern recognition module through an application or algorithm.

8. The system according to claim 1, wherein the vehicle parameter reader is configured for reading the plurality of vehicle parameters through one or more vehicle parameter sensors, and wherein the one or more vehicle parameter sensors comprise an engine control unit (ECU), an instrument duster, a tire pressure sensor, a body control module, a rain sensor, a gyroscope, an accelerometer, a side or main stand sensor, a brake sensor and a handle position sensor.

9. The system according to claim 1, wherein the one or more sensors provided in the smartphone comprise a global positioning system (GPS), an accelerometer, a fingerprint scanner, an iris scanner, a microphone, a speaker, a compass, a camera and a gyroscope.

10. The system according to claim 1, wherein the machine learning module is configured for identifying new routes based on a location related data collected or acquired from the smartphone, through an application or algorithm.

11. The system according to claim 1, wherein the smartphone is further configured for learning and rating user driving patterns and for suggesting riding shortcuts or shortcuts on travel or ride on a map specific to each two or three wheeled vehicle through an application or algorithm.

12. The system according to claim 1, wherein the smartphone is further configured for downloading a software application, and wherein the smartphone is configured to prompt or enable the user to send one or more commands or events for operating the various parts or components of the vehicle using the software application.

13. A computer implemented method comprising instructions stored on a non-transitory computer readable storage medium and run on a computing device provided with a hardware processor and memory for controlling an operation of two or three wheeled vehicle components through a smartphone of the user through one or more applications or algorithms, wherein the method comprising the steps of:

pairing the smartphone of the user with a vehicle module integrated with the vehicle through an application or algorithm;

reading a plurality of vehicle parameters using a vehicle parameter reader via one or more vehicle parameter sensors provided in the vehicle module;

transferring a data related to one or more vehicle parameters to a microprocessor to transmit the data to the paired smartphone using a transceiver;

processing the data received from the microprocessor with the smartphone for generating and forwarding one or more commands or events to the microprocessor to control a plurality of parts or components of two or three wheeled vehicle through an application or algorithm; and directing a vehicle parameter controller to control the plurality of parts or components of the two or three wheeled vehicle through an application or algorithm with the microprocessor based on the received commands or events;

performing one or more vehicle operations remotely through the smartphone of the user through an application or algorithm, and wherein the one or more operations comprise controlling one or more turn indicators or side indicators of the vehicle by providing navigational guidance, controlling the headlight, brake light and pilot lamp of the vehicle based on ambient light conditions, and locking or unlocking a handle Jock of the vehicle, immobilizing the handle lock of the vehicle and operating the handle lock of the vehicle by adding biometric authentication using the smartphone.

14. The method according to claim 13 further comprises uploading the data related to the plurality of vehicle parameters and related to the events or commands to a cloud computing server through an application or algorithm.

15. The method according to claim 13 further comprises analysing the uploaded data with artificial intelligence module or algorithm, machine learning module or algorithm and pattern recognition module or algorithm.

16. The method according to claim 13 further comprises communicating with the smartphone of the user through a transceiver provided in the vehicle module using a wired or wireless communication or connection.

17. The method according to claim 13, further comprises identifying new routes based on a location related data collected or acquired from the smartphone through an application or algorithm.

18. The method according to claim 13 further comprises learning and rating user driving patterns and for suggesting riding shortcuts on a map specific to each two or three wheeled vehicle through an application or algorithm.

\* \* \* \* \*